United States Patent
Duraj et al.

(10) Patent No.: US 8,866,092 B2
(45) Date of Patent: Oct. 21, 2014

(54) RADIATION DETECTION SYSTEM AND A METHOD OF USING THE SAME

(75) Inventors: Artan Duraj, Seven Hills, OH (US); Peter R. Menge, Novelty, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 543 days.

(21) Appl. No.: 13/294,969

(22) Filed: Nov. 11, 2011

(65) Prior Publication Data

US 2012/0126127 A1 May 24, 2012

Related U.S. Application Data

(60) Provisional application No. 61/413,219, filed on Nov. 12, 2010.

(51) Int. Cl.
  G01T 1/20 (2006.01)
  G01T 1/164 (2006.01)
  G01T 3/06 (2006.01)

(52) U.S. Cl.
  CPC .............. *G01T 1/1647* (2013.01); *G01T 3/06* (2013.01)
  USPC ............. 250/369; 250/390.11; 250/370.11; 250/580

(58) Field of Classification Search
  CPC ....... G01T 1/20; G01T 1/2006; G01T 1/2008; G01T 3/06; G01T 3/065; G01T 5/08
  USPC .................... 250/369, 580, 370.11, 390.11
  See application file for complete search history.

(56) References Cited

U.S. PATENT DOCUMENTS

| | | | |
|---|---|---|---|
| 3,944,832 A * | 3/1976 | Kalish .................... 250/361 R |
| 4,316,257 A * | 2/1982 | Del Medico et al. .... 250/363.01 |
| 6,781,115 B2 * | 8/2004 | Stoller et al. ................. 250/266 |
| 6,901,337 B2 | 5/2005 | Tanaka et al. |

(Continued)

OTHER PUBLICATIONS

Davidson, P.L., A New Discriminator Principle for Slow Neutron Counting, Rutherford Laboratory, Chilton, Didcot, Oxon. OX11 OQX. The Science Research Council, dated Oct. 1977, 13 pages.
D. Wolski et. al., "Comparison of n-g Discrimination by Zero-crossing and Digital Charge Comparison Methods," Nuclear Instruments and Methods in Physics Research A, vol. A360, 1995, pp. 584-592.
E. Legler et al., "Pulse Shape Discrimination System for 6LiF(ZnS) Scintillation Counters," The Review of Scientific Instruments, vol. 36, Issue 4, Aug. 1965, pp. 1167-1169.

(Continued)

Primary Examiner — David Porta
Assistant Examiner — Djura Malevic
(74) Attorney, Agent, or Firm — Abel Law Group, LLP; Robert N. Young

(57) ABSTRACT

A radiation detection system can include a scintillator that is capable of emitting scintillating light in response to capturing different types of targeted radiation, a photosensor optically coupled to the scintillator, and a control module electrically coupled to the photosensor. The control module can be configured to analyze state information of the radiation detection system, and select a first technique to determine which type of targeted radiation is captured by the scintillator, wherein the first technique is a particular technique of a plurality of techniques to determine which type of targeted radiation was captured by the scintillator, and the selection is based at least in part on the analysis. In an embodiment, the radiation detection system can be used to change from one technique to another in real time or near real time to allow the radiation detection system to respond to changing conditions.

20 Claims, 2 Drawing Sheets

(56) References Cited

U.S. PATENT DOCUMENTS

| | | | |
|---|---|---|---|
| 7,202,479 B2 | 4/2007 | Saleh et al. | |
| 7,368,722 B2 | 5/2008 | Berthold et al. | |
| 7,646,845 B2 | 1/2010 | Lecomte et al. | |
| 8,173,953 B2 * | 5/2012 | Stoller et al. | 250/262 |
| 8,389,941 B2 * | 3/2013 | Bendahan et al. | 250/363.02 |
| 2002/0175291 A1 * | 11/2002 | Reeder et al. | 250/369 |
| 2004/0262530 A1 * | 12/2004 | Reber et al. | 250/395 |
| 2005/0023479 A1 * | 2/2005 | Grodzins | 250/390.11 |
| 2006/0117164 A1 * | 6/2006 | Coxe et al. | 712/15 |
| 2006/0157655 A1 * | 7/2006 | Mammone et al. | 250/395 |
| 2007/0029493 A1 | 2/2007 | Kniss et al. | |
| 2007/0272874 A1 * | 11/2007 | Grodzins | 250/390.11 |
| 2008/0237475 A1 * | 10/2008 | Michaud et al. | 250/363.03 |
| 2009/0140150 A1 * | 6/2009 | Ivan et al. | 250/361 R |
| 2010/0224783 A1 * | 9/2010 | Frank | 250/366 |
| 2010/0224798 A1 | 9/2010 | Dorenbos et al. | |
| 2010/0226580 A1 * | 9/2010 | Frank | 382/209 |
| 2010/0276602 A1 | 11/2010 | Clothier et al. | |
| 2011/0204243 A1 * | 8/2011 | Bendahan et al. | 250/367 |
| 2012/0061575 A1 * | 3/2012 | Dunleavy et al. | 250/362 |
| 2013/0214145 A1 * | 8/2013 | Roscoe et al. | 250/269.3 |
| 2014/0042330 A1 * | 2/2014 | Gozani et al. | 250/367 |

OTHER PUBLICATIONS

G. Ranucci, "An Analytical Approach to the Evaluation of the Pulse Shape Discrimination Properties of Scintillators," Nuclear Instruments and Methods in Physics Research A, vol. A354, 1995, pp. 389-399.

V.T. Jordanov et al., "Digital Pulse-Shape Analyzer Based on Fast Sampling of an Integrated Charge Pulse," IEEE Transactions on Nuclear Science, vol. 42, Issue 4, Aug. 1995, pp. 683-687.

P. Chandrikamohan, et al., "Comparison of Pulse Shape Discrimination Methods for Phoswich and CsI:TI Detectors", IEEE Transactions on Nuclear Science, vol. 54, Issue 2, Apr. 2007, p. 398-403.

A. T. Farsoni, et al., "A System for Simultaneous Beta and Gamma Spectroscopy", Nuclear Instruments and Methods in Physics Research A, vol. A578, 2007, p. 528-536.

S. Marrone et al., "Pulse Shape Analysis of Liquid Scintillators for Neutron Studies," Nuclear Instruments and Methods in Physics Research A, vol. A490, 2002, pp. 299-307.

S. Yousefi, "Digital Pulse Shape Discrimination Methods for Triple-Layer Phoswich Detectors Using Wavelets and Fuzzy Logic," Thesis, Oregon State University, May 29, 2008. 132 pages.

\* cited by examiner

RADIATION DETECTION SYSTEM AND A METHOD OF USING THE SAME

CROSS-REFERENCE TO RELATED APPLICATION

This application claims priority under 35 U.S.C. §119(e) to U.S. Patent Application No. 61/413,219 entitled "Radiation Detection System and a Method of Using the Same," by Duraj et al., filed Nov. 12, 2010, which is assigned to the current assignee hereof and incorporated herein by reference in its entirety.

FIELD OF THE DISCLOSURE

The present disclosure is directed to radiation detection systems and methods of using such radiation detection systems.

BACKGROUND

Radiation detection systems are used in a variety of applications. For example, radiation detector systems can include scintillator arrays that can be used for imaging applications, such as a medical diagnostic apparatus, a security screening apparatus, military applications, or the like. Further improvement of radiation detection systems is desired.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillation and radiation detection arts.

Figure 1:
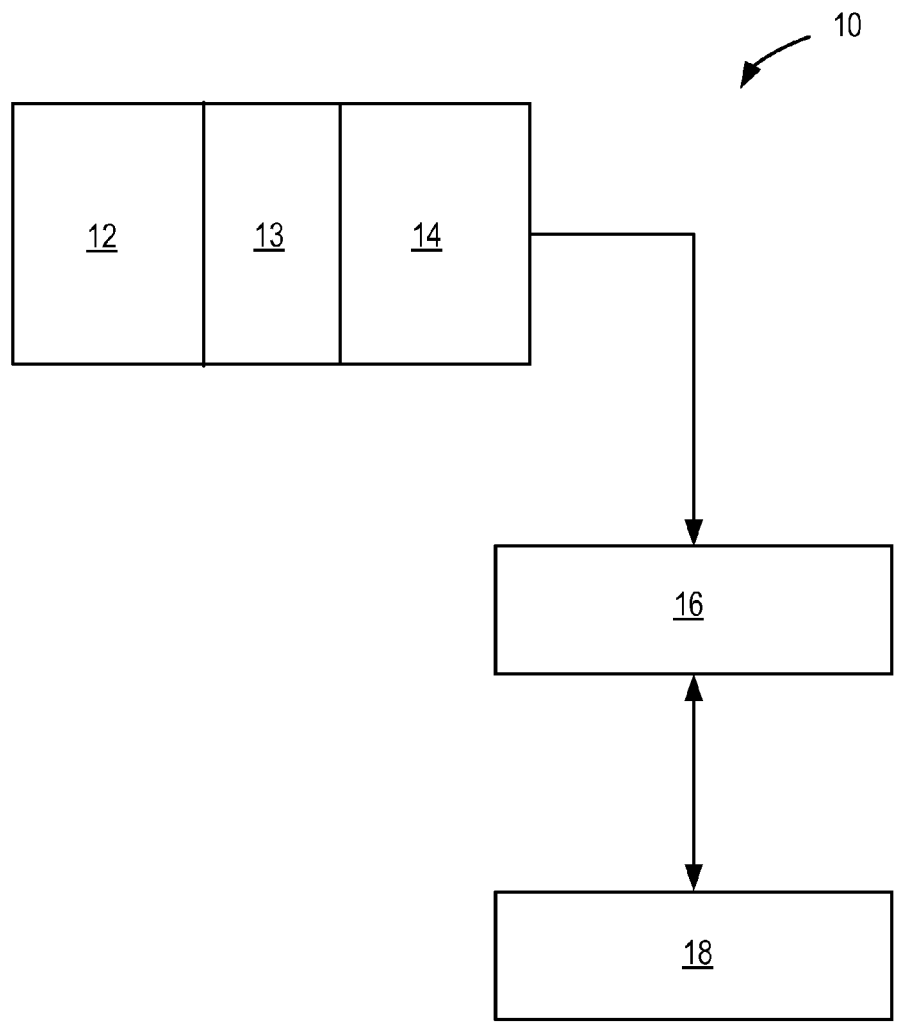
FIG. 1 includes a depiction of a radiation detection system in accordance with embodiments described herein.

FIG. 1 includes an illustration of an embodiment of a radiation detector system 10. The radiation detector system can be a medical imaging apparatus, a well logging apparatus, a security inspection apparatus, or the like. In a particular embodiment, the radiation detection system can be used for gamma ray analysis, such as a Single Positron Emission Computer Tomography (SPECT) or Positron Emission Tomography (PET) analysis.

In the embodiment illustrated, the radiation detection system 10 includes a scintillator 12, a wavelength shifting material 13, a photosensor 14, a control module 16, and a radiation counter 18. The photosensor 14 can be optically coupled to the scintillator 12. The wavelength shifting material 13 is optional and, when present, is optically coupled to the scintillator 12 and the photosensor 14. Whether or not the wavelength shifting material 13 is present, a window may be disposed between the scintillator 12 and the photosensor 14. The control module 16 can be electronically coupled to the photosensor 14 and bidirectionally coupled to the radiation counter 18. In another embodiment, the control module 16 can be coupled to other equipment in addition to or in place of the radiation counter 18.

The scintillator 12 includes a material that can emit scintillating light in response to capturing targeted radiation. In an embodiment, the scintillator 12 can include NaI:Tl, CsI:Tl, $Bi_4Ge_3O_{12}$, $LaBr_3$:Ce, $LaCl_3$:Ce, $CaF_2$:Eu, $Gd_2SiO_5$:Ce, $GdI_3$:Ce, $Lu_{2-x}Y_xSiO_5$, wherein x is in a range of 0 to 2; ZnS:Ag, ZnS:Cu, $Y_2SiO_5$:Ce, ZnO:Ga, ZnCdS:Cu, $Cs_2LiYCl_6$:Ce, $Cs_2LiYCBr_6$:Ce $Cs_2LiLaCl_6$:Ce, $Cs_2LiGdCl_6$(Ce), $Cs_2LiLaBr_6$:Ce, LiF(Ti), LiI(Eu), $Li_6Gd(BO_3)_3$, or an organic liquid scintillator that includes an organic solvent, such as toluene, xylene, benzene, phenylcyclohexane, triethylbenzene, decalin, phenylxylyl ethane (PXE). In addition, the liquid scintillator material can include a neutron absorber, such as a compound including a neutron responsive element, such as $^{10}B$, $^6Li$, $^{113}Cd$, $^{157}Gd$, or any combination thereof.

In a particular embodiment, the scintillator 12 can include ZnS:Ag, ZnS:Cu, $Y_2SiO_5$:Ce, ZnO:Ga, ZnCdS:Cu, $Cs_2LiYCl_6$:Ce, $Cs_2LiYCBr_6$:Ce $Cs_2LiLaCl_6$:Ce, $Cs_2LiGdCl_6$(Ce), $Cs_2LiLaBr_6$:Ce, LiF(Ti), LiI(Eu), $Li_6Gd(BO_3)_3$, or an organic liquid scintillator that includes an organic solvent, such as toluene, xylene, benzene, phenylcyclohexane, triethylbenzene, decalin, phenylxylyl ethane (PXE). In addition, the liquid scintillator material can include a neutron absorber, such as a compound including a neutron responsive element, such as $^{10}B$, $^6Li$, $^{113}Cd$, $^{157}Gd$, or any combination thereof. In a more particular embodiment, the neutron absorber can include $^6LiF$. A scintillator that includes $^6LiF$ and a ZnS is commercially available as BC-704™-brand and BC-705™-brand scintillator products from Saint-Gobain Crystals of Hiram, Ohio, USA. When the scintillator includes $^6$LiF and a ZnS, the scintillator 12 can emit scintillating light when gamma radiation or a thermal neutron is captured by the scintillator 12. Thus, the mere emission of scintillating light from the scintillator 12 cannot be isolated to gamma radiation or a thermal neutron without a further analysis being made.

Although not illustrated, a reflector or a neutron modifier may be disposed around the scintillator 12. The neutron modifier can be used to convert fast neutrons to thermal neutrons when the radiation detection system is designed to detect thermal neutrons.

When present, the wavelength shifting material 13 can be used to shift the scintillating light from its original wavelength, which may or may not be outside the visible light spectrum, to a wavelength to which the photosensor 14 is more responsive. For example, the wavelength shifting material can change the original wavelength of the scintillating light to blue light or green light when the photosensor 14 is more responsive to blue light or green light. Alternatively, the wavelength shifting material 13 may be used to direct the scintillation light into a more desirable geometry, such as into an optical fiber. The wavelength shifting material 13 can include a polyvinyltoluene, a polystyrene, a polyacrylate, or any combination thereof. The BC-704™-brand or BC-705™-brand scintillator products include wavelength shifters.

The photosensor 14 can receive the scintillating light or a derivative thereof, such as the wavelength shifted light, and generate an electronic signal, such as an electronic pulse, in response to the scintillating light or its derivative. The photosensor 14 can include a photomultiplier, such as a photomultiplier tube or a semiconductor-based photomultiplier. Although not illustrated in FIG. 1, an amplifier may be used to amplify the electronic signal from the photosensor 14 before it reaches the control module 16.

The control module 16 can include control logic that can be used during the operation of the radiation detection system 10. The control logic can be in hardware, software, firmware, or a combination thereof. In a particular embodiment the control logic can be in the form of circuits within an integrated circuit or on a printed circuit board, a combination of a central processing unit that can receive coded instructions, a field programmable gate array ("FPGA"), another suitable means for operating the radiation detection system 10, or any combination thereof. The control module 16 can also include a buffer to temporarily store data before the data are analyzed, written to storage, read, transmitted to another component or device, another suitable action is performed on the data, or any combination thereof. In a particular embodiment, the buffer can include a first-in-first-out ("FIFO") buffer memory.

The control logic of the control module 16 can be configured to perform a variety of tasks. Some of the tasks listed herein are intended to be exemplary and not limiting. The control logic can be configured to analyze state information of the radiation detection system 10, including any portion thereof. State information can include a radiation count rate, such as from the radiation counter 18, an incoming data rate in the form of electronic signals from the photosensor 14; how full the buffer is; the data accumulation rate of the buffer (e.g., data receiving rate minus data transmission rate at the buffer); amplitude of the scintillating light or a derivative thereof (for example, as determined by analysis of the electronic signal from the photosensor 14); number or types of radiation sources near a radiation detection area for the scintillator 12; size or speed of objects passing through the radiation detection area for the scintillator 12; temperatures of the scintillator 12 and photosensor 14; other suitable information affecting detection of radiation; or any combination thereof. Thus, the state information can be broad in scope.

The control logic can also be configured to select a particular type of technique used to determine which type of targeted radiation is being sensed by the radiation detection system 10. The control logic can further be configured to determine the particular type of radiation detected and increment a radiation counter corresponding to the radiation detected.

The control logic can be configured to switch between techniques. The switch can be performed in response to changes in the state information, which may include changing conditions in the environment near the scintillator 12 and photosensor 14. The ability to adapt to the changing conditions is a significant advance over conventional radiation detection systems. More details regarding what may trigger switching and when it may occur are addressed later with respect to methods of using the radiation detection system 10.

Figure 2:
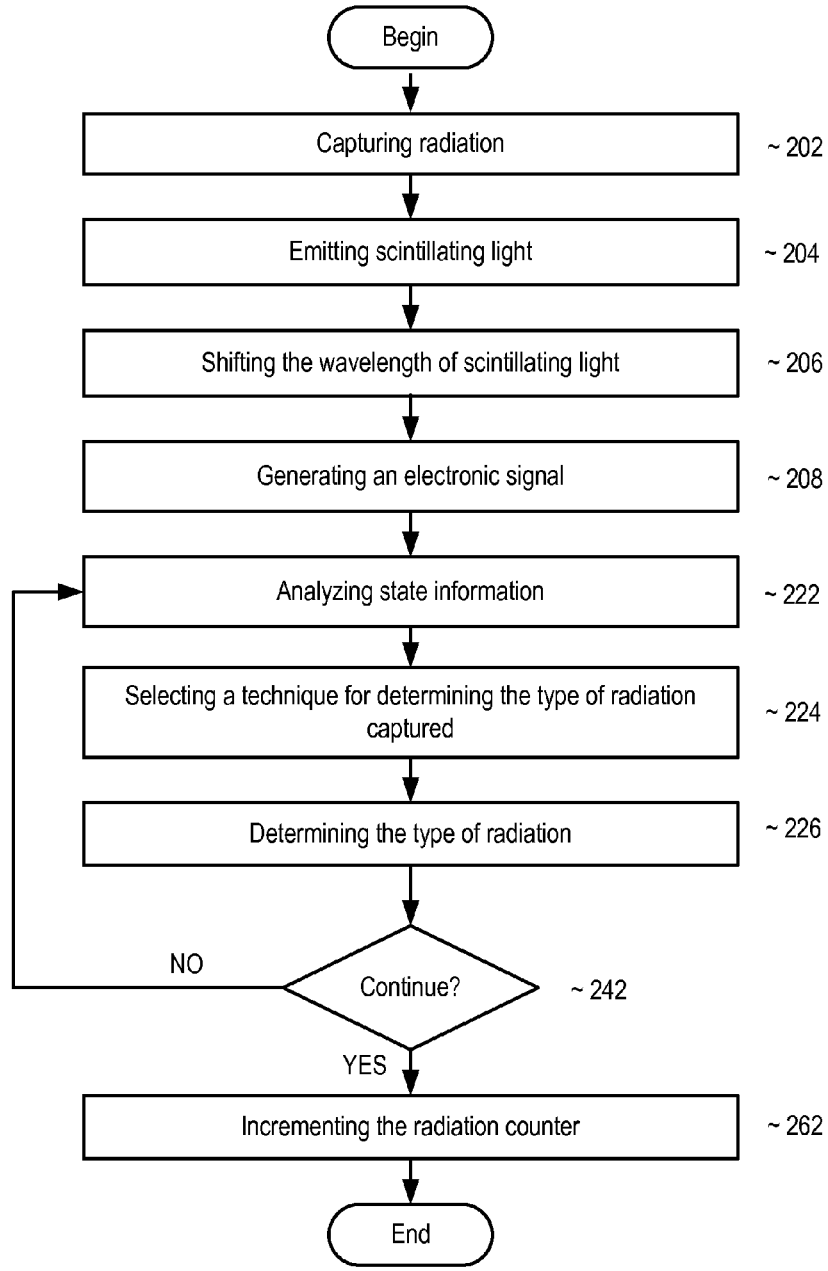
FIG. 2 includes a flow chart of a process of using the radiation detection system of FIG. 1 in accordance with embodiments described herein.

FIG. 2 includes a flowchart of an exemplary method of using the radiation detection system 10. The method will be described with respect to components within the radiation detection system 10 as illustrated in FIG. 1. After reading this specification, skilled artisans will appreciate that activities described with respect to particular components may be performed by another component. Further, activities described with respect to particular components may be combined into a single component, and activities described with respect to a single component may be distributed between different components.

The method can begin with capturing radiation and emitting scintillating light, at blocks 202 and 204 in FIG. 2. The radiation can be captured by the scintillator 12, and the scintillating light can be emitted by the scintillator 12 in response to capturing the radiation. The method can further include shifting the wavelength of the scintillating light, at block 206. In an embodiment, the scintillating light emitted by the scintillator 12 can be shifted to a different wavelength by the wavelength shifting material 13. The wavelength shifted light is an example of light that is a derivative of the scintillating light. The photosensor 14 may be more responsive (for example, have a higher quantum efficiency) for the wavelength shifted light as compared to the original wavelength of the scintillating light. The wavelength shifting activity is not needed when the photosensor 14 has an adequate quantum efficiency for the scintillating light at the original wavelength. Alternatively, the wavelength shifting material 13 may be used to transport the derivative light to the photosensor, for example a wavelength shifting optical fiber. The method can also include generating an electronic signal, at block 208. The photosensor 14 can generate an electronic signal in the form of an electronic pulse in response to receiving the scintillating light or its derivative. In a particular embodiment, the scintillating light or its derivative is received at the cathode of the photosensor 14, and electrons are emitted from the cathode. The electrons can be multiplied to provide the electronic signal that is transmitted from the anode of the photosensor 14. The electronic signal may be amplified within or before it reaches the control module 16.

The method can also include analyzing state information and selecting a technique for determining the type of radiation captured, at blocks 222 and 224 in FIG. 2. The radiation detection system 10 may include or have access to different techniques used to determine the type of radiation captured, for example, neutrons or gamma radiation. A table of different techniques that can be used to determine whether captured radiation is a neutron or gamma radiation is located after this paragraph. The references listed in the table describe the techniques in more detail, and each of the references is incorporated by reference for their teachings of such techniques. The techniques in the table are exemplary and do not limit the scope of the present invention. After reading this specification, skilled artisans will appreciate that other techniques can be used.

TABLE

| Technique | Reference |
|---|---|
| Constant fraction discrimination (CFD) | D. Wolski et. al., "Comparison of n-g Discrimination by Zero-crossing and Digital Charge Comparison Methods," Nuclear Instruments and Methods in Physics Research A, Vol. A360, 1995, pp. 398-403 |
| Zero crossing (ZC) | E. Legler et al., "Pulse Shape Discrimination System for 6LiF(ZnS) Scintillation Counters," The Review of Scientific Instruments, Vol. 36, Issue 4, August 1965, pp. 1167-1169 |
| Rise time discrimination (RTD) | G. Ranucci, "An Analytical Approach to the Evaluation of the Pulse Shape Discrimination Properties of Scintillators," Nuclear Instruments and Methods in Physics Research A, Vol. A354, 1995, pp. 389-399 |
| Charge comparison (CC) | V. T. Jordanov et al., "Digital Pulse-Shape Analyzer Based on Fast Sampling of an Integrated Charge Pulse," IEEE Transactions on Nuclear Science, Vol. 42, Issue 4, August 1995, pp. 683-687 |
| Constant fraction discrimination (CFD + B) | P. Chandrikamohan, et al., "Comparison of Pulse Shape Discrimination Methods for Phoswhich and CsI:Tl Detectors", IEEE Transactions on Nuclear Science, Vol. 54, Issue 2, April 2007, p. 398-403 This is a technique where the background signal is retained. |
| Fast-Slow Ratio (FSR) | A. T. Farsoni, et al., "A System for Simultaneous Beta and Gamma Spectroscopy", Nuclear Instruments and Methods in Physics Research A, Vol. A578, 2007, p. 528 |
| Curve fit (FIT) | S. Marrone et al., "Pulse Shape Analysis of Liquid Scintillators for Neutron Studies," Nuclear Instruments and Methods in Physics Research A, Vol. A490, 2002, pp. 299-307 |
| Fast Fourier Transform (FFT) | U.S. Pat. No. 7,202,479 |
| Fuzzy discrimination (FUZ) | S. Yousefi, "Digital Pulse Shape Discrimination Methods for Triple-Layer Phoswich Detectors Using Wavelets and Fuzzy Logic," Thesis, Oregon State University, May 29, 2008 |

Some of the techniques may be performed faster than others, still other techniques may be more accurate than others, further techniques may be relatively better when the signal-to-noise ratio is low (for example, low amplitude for the scintillating light or high background noise), etc. The control module 16 can analyze the state information and select a technique for the particular state information.

For example, the radiation count rate may be low, and therefore, a relatively more accurate and slower technique can be used. If the radiation count rate is higher, the technique may not be adequate, and a different technique is then selected. In another example, the amplitude of the scintillating light or its derivative as sensed by the photosensor 14 may be relatively low. Accordingly, the signal-to-noise ratio may be low, and a technique that is relatively more accurate when the signal-to-noise ratio is low may be selected. Along similar lines, the temperature or vibration rate of the scintillator 12 and the photosensor 14 may affect the selection of the technique. In addition, state information regarding the incoming data rate (from the photosensor 14 to the control module 16) or the state of the buffer may affect the selection of the technique. For example, if the incoming data rate is too high or if the buffer is too full or quickly accumulating data (receiving more incoming data than transmitting date), a relatively faster technique may be selected.

In still another example, combinations of parameters may be used. For example, a particular technique may be selected when the radiation count rate is low and the amplitude of the scintillating light or its derivative is low, and another particular technique may be selected when the radiation count rate is low and the amplitude of the scintillating light or its derivative is high. Still another particular technique may be selected when the radiation count rate is high and the amplitude of the scintillating light or its derivative is low, and a further particular technique may be selected when the radiation count rate is high and the amplitude of the scintillating light or its derivative is high. In another embodiment, more than one technique may be selected. Based on the state information, the control module 16 may select a subset of techniques that will be used to determine which type of radiation is detected.

After reading this specification, skilled artisans will appreciate that the method described herein is flexible and can allow a particular technique to be selected based on any piece or combination of pieces of state information, including trends in the state information.

After the technique has been selected, the method can further include determining the type of radiation, at block 226 in FIG. 2. In an embodiment, the scintillator 12 may be capable of emitting scintillating light when it captures both neutrons and gamma radiation. The selected technique may be used to determine if the captured radiation corresponds to a neutron or gamma radiation.

When more than one technique is selected, the techniques may be performed in parallel or in series. The determination may be made based on the results obtained using the techniques. If the results from the techniques are the same (the captured radiation is a neutron or gamma radiation), the outcome of the determination of radiation type is indicated by the consistent results. In another situation, one or some of the techniques may produce one result, and one or more other techniques may produce a different result. In one particular embodiment, the determination may be obtained by a simple majority. For example, three techniques may indicate that the captured radiation is a neutron, and another technique may indicate that the captured radiation is gamma radiation. The determination may be made that the captured radiation is neutrons because more techniques identified the captured radiation as such.

In another embodiment, a different method may be used to resolve inconsistent results. For example, one technique may indicate that the captured radiation is a neutron, and another technique may indicate that the captured radiation is gamma radiation. A confidence level corresponding to each result may also be produced. The result with the higher confidence level will be used to determine the type of radiation.

Referring to the flow chart in FIG. 2, while the determination is being made or shortly thereafter, a decision is made whether to continue, at diamond 242. If the method is to continue ("YES" branch), the determination is completed if this has not already occurred, and the method can further include incrementing the radiation counter, at block 262. For example, when the determination is made that the captured radiation is to a neutron, a neutron counter is incremented, and when the captured radiation is gamma radiation, a gamma radiation counter is incremented.

Referring to the flow chart in FIG. 2, while the determination is being made or shortly thereafter, the control method can decide the method should not continue ("NO" branch from diamond 242 in FIG. 2). The reason for discontinuing may be for a change in the state information for the radiation detection system 10.

In one embodiment, the radiation detection system may be using a relatively slow and highly accurate technique for counting neutrons. A gamma radiation source may be placed near the radiation detection area of the scintillator 12. If the scintillator 12 can detect both neutrons and gamma radiation, the relatively slow and highly accurate technique may not be able to be used due to the presence of the gamma radiation source if the radiation count rate due to the gamma radiation is too high. The incoming data rate to the control module 16, the fraction of the buffer occupied by data that still needs to be analyzed, the rate at which data is being received by the buffer, the radiation count rate, or any combination thereof could be used as state information analyzed by the radiation detection system. The control module 16 may determine that another technique that is better suited for the changed conditions (in view of the updated state information) should be used.

In another embodiment, the radiation detection system may be using a particular technique for counting targeted radiation. The control module 16 may be having difficulty determining whether a neutron or gamma radiation is being detected. Such a condition may be manifested in a relatively low amplitude of the scintillating light or derivative light (wavelength shifted light), a low signal-to-noise ratio, a relatively longer time needed to determine the type of radiation, or any combination thereof. In view of such state information, the control module 16 may determine that another technique should be used. The switch from one technique to the other may occur after an electronic signal from the photosensor 14 has been analyzed. Alternatively, the current analysis could be terminated before completion, and the other technique could be used to analyze the signal.

Further, the radiation detection system may be characterized for environmental conditions. For example, if the radiation detection system is used outdoors, it may need to be operated over a temperature range of approximately −40° C. to +50° C. Similarly, for well logging, the temperature can exceed 100° C. and even 200° C., and the scintillator 12 and photosensor 14 may be subjected to vibration during use. These varying conditions may affect the amount of scintillating light produced by the scintillator 12 or electrons emitted by the photosensor 14. As the operating conditions change, sensors within the radiation detection system can send signals to the control module 16 regarding the readings of the sensors. The control module 16 may switch between techniques as the operating conditions change.

In an embodiment, switching between techniques can be performed in real time or near real time. In a particular embodiment, the switch can occur as quickly as the control module 16 normally operates, and typically will be less than a second. The switch may occur before the electronic signal from the photosensor 14 is completely analyzed. Thus, the determining activity as previously described in block 226 of FIG. 2 may be terminated before a result is obtained. The other technique is used to perform the determination, and the counter would be incremented based on the result obtained by the other technique. Such a procedure corresponds to a real-time implementation. In another embodiment, the switch may occur after the determination activity with the original technique is completed. In this embodiment, the counter may not be incremented. The switch to the other technique is performed, and the other technique is used to determine the type of radiation. The counter is incremented based on the result obtained by the other technique. Such a procedure corresponds to a near real-time implementation, as the switch occurs after an ongoing activity that is no longer needed (for example, determination using the original technique), is allowed to go to completion.

In another embodiment, a time period may pass after the analysis of the state information and selection has been made, but before the switch (acting on the selection) to another technique is made. The time period may be used to allow an operator to adjust the radiation detection system or prepare equipment that receives information from the radiation detection system. In another embodiment, the control module 16 may include logic that adjusts the radiation detection system for the newly selected technique. In still another embodiment, the time period may allow an operator to override a selection made by the control module 16, such that the newly selected technique is not activated. For example, the operator may prefer the current technique over the newly selected technique, or the operator may instruct the radiation detection system to use yet another technique. In an embodiment, the time period may be no greater than approximately 9 minutes, and in another embodiment, no greater than approximately 1 minute. In a further embodiment, the time period may be no greater than approximately 15 seconds. Although there is no minimum limit to the time period, the time period may be at least approximately 0.05 second.

Embodiments as described herein can help a radiation detection system to select a technique to determine which type of radiation is detected. The control module 16 can select a different technique based at least in part on state information of the radiation detection system. Thus, the radiation detection system can more readily adapt to current or changing conditions.

EXAMPLES

The concepts described herein will be further described in the following examples, which do not limit the scope of the invention described in the claims. The examples below illustrate how the methods described herein can be used to determine whether captured radiation is a neutron or gamma radiation. The techniques listed in the Table above are used in the examples below, and the radiation detection system is used at a port of entry, such as a border crossing, an airport, a seaport, or the like. The object being analyzed by the radiation detection system is a vehicle. The Examples describe how the radiation detection system determines whether object is emitting neutrons, gamma radiation, both or neither.

Example 1

Example 1 demonstrates that a relative low threat target can be analyzed using techniques that are better suited for low radiation count and low amplitude techniques. When the object is near the scintillator 12, a preliminary radiation count rate and amplitude checks are performed. For example, after a first radiation count is made, the control module 16 determines whether another radiation count is made during a predetermined time period after the prior radiation count occurs. If the no other radiation count occurs during the predetermined time, the radiation detection system determines that the radiation count rate is relative low. During the same time period or just before or after performing a preliminary radiation count rate, the radiation detection system analyzes the electronic signal from the photosensor 14 to determine the maximum amplitude of scintillating light or wavelength shifted light received by the photosensor 14. When the maximum amplitude is below a predetermined value, the control module 16 selects techniques that are better suited for low radiation count rate and low amplitude. Referring to the Table above, the control module 16 uses the preliminary radiation count and amplitude, which are particular types of state information, and selects the RTD and CC techniques, as such techniques have been previously identified as being better suited for low radiation counts and low amplitude as compared to the other techniques.

In this particular example, both techniques produce results that indicate captured radiation is gamma radiation is emitted from the object. Thus, the control module 16 makes a determination that the captured radiation is gamma radiation and increments the gamma radiation counter.

Example 2

Example 2 demonstrates that an object that does not emit any of the targeted radiation can be analyzed using the radiation detection system. The control module 16 can default to a particular set of conditions, such as low radiation count rate and low amplitude, as described in Example 1. No radiation counts are detected, and thus, the radiation detection system determines that the object is not emitting neutrons or gamma radiation. Neither the neutron counter nor the gamma radiation counter is incremented.

Example 3

Example 3 is similar to Example 2, except that a particular technique does not need to be selected. For example, a time-out technique may be used. When the object is near the scintillator 12, no radiation count is detected during a predetermined time period. The radiation detection system determines that the object is not emitting neutrons or gamma radiation. Neither the neutron counter nor the gamma radiation counter is incremented.

Example 4

Example 4 demonstrates that inconsistent results between techniques can be resolved using confidence levels associated with the results. An object that includes naturally radioactive material is placed near the scintillator 12. When the object is near the scintillator 12, a preliminary radiation count rate and amplitude checks are performed as described with respect to Example 1. In Example 4, the radiation count rate is low, and the amplitude is high. The control module 16 selects techniques that are better suited for low radiation count rate and high amplitude. Referring to the Table above, the control module 16 uses the preliminary radiation count and amplitude and selects the CFD and ZC techniques, as such techniques have been previously identified as being better suited for low radiation counts and high amplitude as compared to the other techniques.

In this particular example, the CFD technique produces a result that indicates a particular radiation count is a neutron, and the ZC technique produces a result that indicates the same particular radiation count is gamma radiation. With respect for thresholds used for determining the type of radiation, the CFD technique has a value that is farther from a determination threshold (for distinguishing a neutron from gamma radiation) than a corresponding value for ZC. The control module 16 determines that that confidence level associated with the CFD technique for the particular radiation count is higher, and therefore determines that the particular radiation count corresponds to a neutron. Thus, the control module 16 makes a determination that the captured radiation is a neutron and increments the neutron counter.

Example 5

Example 5 demonstrates that inconsistent results between techniques can be resolved using a voting technique. An object that includes naturally radioactive material is placed near the scintillator 12 of the radiation detection system. When the object is near the scintillator 12, a preliminary radiation count rate and amplitude checks are performed as described with respect to Example 1. In Example 5, the radiation count rate is high, and the amplitude is high. The control module 16 selects techniques that are better suited for high radiation count rate and high amplitude. Referring to the Table above, the control module 16 uses the preliminary radiation count and amplitude, which are particular types of state information, and selects the CFD+B, FSR, and FIT techniques as such techniques have been previously identified as being better suited for high radiation counts and high amplitude as compared to the other techniques.

In this particular example, the CFD+B and FSR techniques produce results that indicate a particular radiation count is gamma radiation, and the FIT technique produces a result that indicates the same particular radiation count is a neutron. The control module 16 determines that more techniques indicate that the particular radiation count is gamma radiation, and therefore determines that the particular radiation count is gamma radiation. Thus, the control module 16 makes a determination that the captured radiation is gamma radiation and increments the gamma radiation counter.

Example 6

Example 6 demonstrates that an object that includes special radioactive material, for example, $^{241}$Am, $^{252}$Cf, $^{239}$Pu, $^{232}$U, $^{235}$U can be analyzed. When the object is near the scintillator 12, a preliminary radiation count rate and amplitude checks are performed as described with respect to Example 1. In Example 6, the radiation count rate is high, and the amplitude is low. The control module 16 selects techniques that are better suited for high radiation count rate and low amplitude. Referring to the Table above, the control module 16 uses the preliminary radiation count and amplitude and selects the FFT and FUZ techniques as such techniques have been previously identified as being better suited for high radiation counts and low amplitude as compared to the other techniques.

In this particular example, both techniques produce results that indicate a particular count is a neutron is emitted from the object. Thus, the control module 16 makes a determination that the captured radiation is a neutron and increments the neutron counter.

Example 7

Example 7 demonstrates that an object that includes different sources of radioactive material can be analyzed. When the object is near the scintillator 12, a preliminary radiation count rate and amplitude checks are performed as described with respect to Example 1. In Example 7, the radiation count rate is high, and the amplitude is high. The control module 16 selects techniques that are better suited for high radiation count rate and high amplitude. Further, the control module 16 may determine that data within the buffer is too full or the incoming data rate (from the photosensor 14 to the buffer) is too high. The fraction of the buffer occupied by data that still needs to be analyzed and the incoming data rate are further examples of state information. Referring to the Table above, the control module 16 uses the preliminary radiation count and amplitude and selects the CFD+B and FSR techniques, as such techniques have been previously identified as being better suited for high radiation counts, high amplitude as compared to many of the other techniques.

Because the buffer is too full or incoming data rate is too high, the control module 16 assigns each electronic pulse to only one technique. A particular electronic pulse is assigned only to the CFD+B technique, and a different electronic pulse is assigned only to the FSR technique. The assignment of the different electronic pulse occurs after the assignment of the particular electronic pulse is made and before the determination of the type of radiation is made for the particular electronic pulse. Accordingly, the two different techniques are processing the electronic pulses in parallel. In this particular example, the CFD+B technique produces a result that indicates a particular electronic pulse corresponds to a neutron, and the ZC technique produces a result that indicates the different electronic pulse corresponds to gamma radiation. The control module 16 makes a determination that the particular electronic signal corresponds to a neutron and increments the neutron counter, and that the different electronic signal corresponds to gamma radiation and increments the gamma radiation counter. Thus, the control module 16 determines that the object is emitting both neutrons and gamma radiation.

Many different aspects and embodiments are possible. Some of those aspects and embodiments are described herein. After reading this specification, skilled artisans will appreciate that those aspects and embodiments are only illustrative and do not limit the scope of the present invention. Additionally, those skilled in the art will understand that some embodiments that include analog circuits can be similarly implemented using digital circuits, and vice versa.

In a first aspect, a radiation detection system can include a scintillator that is capable of emitting scintillating light in response to capturing different types of targeted radiation and a photosensor optically coupled to the scintillator. The radiation detection system can further include a control module electrically coupled to the photosensor, wherein the control module is configured to analyze state information of the radiation detection system and select a first technique to determine which type of targeted radiation is captured by the scintillator, wherein the first technique is a particular technique of a plurality of techniques to determine which type of targeted radiation was captured by the scintillator, and the selection is based at least in part on the analysis.

In an embodiment of the first aspect, the state information includes a radiation count rate, an incoming data rate, a parameter related to a hardware constraint of the radiation detection system, an amplitude of the scintillating light or a derivative of the scintillating light, or any combination thereof. In a particular embodiment, the parameter related to the hardware constraint includes a fraction of a buffer occupied by buffered data that has not been fully analyzed.

In another embodiment of the first aspect, analyze the state information includes determine a radiation count rate, select the first technique when the radiation count rate is below a predetermined rate, and the control module is further configured to select a second technique when the radiation count rate is at least the predetermined rate, wherein the second technique is another particular technique of the plurality of techniques. In still another embodiment, analyze the state information includes determine an incoming data rate, select the first technique when the incoming data rate is below a predetermined rate, and the control module is further configured to select a second technique when the incoming data rate is at least the predetermined rate, wherein the second technique is another particular technique of the plurality of techniques. In yet another embodiment, analyze the state information includes determine an amplitude of the scintillating light or the derivative, select the first technique when the amplitude is below a predetermined amplitude, and the control module is further configured to select a second technique when the amplitude is at least the predetermined amplitude, wherein the second technique is another particular technique of the plurality of techniques.

In a further embodiment of the first aspect, analyze the state information includes determine a radiation count rate and determine an amplitude of the scintillating light or a derivative of the scintillating light, and select the first technique when the radiation count rate is below a predetermined rate and the amplitude is below a predetermined amplitude. The control module is further configured to select a second technique when the radiation count rate is below the predetermined rate and the amplitude is at least the predetermined amplitude, select a third technique when the radiation count rate is at least the predetermined rate and the amplitude is below the predetermined amplitude, and select a fourth technique when the radiation count rate is at least the predetermined rate and the amplitude is at least the predetermined amplitude, wherein the second, third, and fourth techniques are other particular techniques of the plurality of techniques.

In still a further embodiment of the first aspect, the radiation detection system further includes a wavelength shifting material disposed between the scintillator and the photosensor. In any of the preceding embodiments, the control module is configured to determine which type of radiation is detected. In a particular embodiment, the control module is configured to increment a counter corresponding to the type of radiation detected. In a more particular embodiment, the control module is configured to switch from the first technique to another technique in response to a change in the state information. In an even more particular embodiment, the switch is performed in real time or near real time. In another even more particular embodiment, the switch is performed after the first technique is selected, the determination of which type of radiation is detected is performed by the other technique, and the counter is incremented in response to detection using the other technique.

In a second aspect, a method of using radiation detection system can include capturing radiation at a scintillator, emitting scintillating light in response to capturing the radiation, and generating an electronic signal at a photosensor in response to receiving scintillating light or a derivative of the scintillating light. The method can further include analyzing state information of the radiation detection system and selecting a first technique to determine which type of targeted radiation corresponds to the radiation captured. The first technique can be a particular technique of a plurality of techniques to determine which type of targeted radiation was captured, and selecting is based at least in part on the analysis.

In an embodiment of the second aspect, the state information includes a radiation count rate, an incoming data rate, a parameter related to a hardware constraint of the radiation detection system, an amplitude of the scintillating light, or any combination thereof. In a more particular embodiment, the parameter related to the hardware constraint includes a fraction of a buffer occupied by buffered data that has not been fully analyzed. In another embodiment, analyzing the state information includes determining a radiation count rate and selecting the first technique or a second technique, wherein the second technique is another particular technique of the plurality of techniques, the first technique is selected when the radiation count rate is below a predetermined rate, and the second technique is selected when the radiation count rate is at least the predetermined rate. In still another embodiment, analyzing the state information includes determining an incoming data rate and selecting the first technique or a second technique, wherein the second technique is another particular technique of the plurality of techniques, the first technique is selected when the incoming data rate is below a predetermined rate, and the second technique is selected when the incoming data rate is at least the predetermined rate. In yet another embodiment, analyzing the state information includes determining an amplitude of the scintillating light or a derivative of the scintillating light and selecting the first technique or a second technique, wherein the second technique is another particular technique of the plurality of techniques, the first technique is selected when the amplitude is below a predetermined rate and the second technique is selected when the amplitude is at least the predetermined rate.

In a further embodiment, analyzing the state information includes determining a radiation count rate and an amplitude of the scintillating light or the derivative thereof, and selecting the first technique, a second technique, a third technique, or a fourth technique, wherein the second technique, the third technique, and the fourth techniques are other particular techniques of the plurality of techniques, the first technique is selected when the radiation count rate is below a predetermined rate and the amplitude is below a predetermined amplitude, the second technique is selected when the radiation count rate is below the predetermined rate and the amplitude is at least the predetermined amplitude, the third technique is selected when the radiation count rate is at least the predetermined rate and the amplitude is below the predetermined amplitude, and the fourth technique is selected when the radiation count rate is at least the predetermined rate and the amplitude is at least the predetermined amplitude.

In a particular embodiment of any of the preceding embodiments of the second aspect, the method further includes shifting a wavelength of the scintillating light to a different wavelength to form the derivative of the scintillating light before generating the electronic signal at the photosensor. In another particular embodiment of any of the preceding embodiments of the second aspect, the method further includes determining which type of radiation is detected. In a more particular embodiment, determining which type of radiation is detected is performed after selecting a particular technique. In another particular embodiment of any of the preceding embodiments of the second aspect, the method further includes incrementing a counter corresponding to the type of radiation detected. In a more particular embodiment, the method further includes switching from the first technique to another technique in response to a change in the state information. In an even more particular embodiment, switching is performed in real time or near real time in response to the change in the state information. In another even more particular embodiment, switching is performed after selecting the first technique, determining which type of radiation is detected is performed by the other technique, and incrementing is performed in response to detection using the other technique. In still a further embodiment of any of the preceding embodiments of the second aspect, determining which type of radiation is detected using the other technique is performed after completing determining of which type of radiation is detected using the first technique. In still a further embodiment of any of the preceding embodiments of the second aspect, the method further includes terminating determining of which type of radiation is detected using the first technique before determination using the first technique is completed.

In a particular embodiment of any of the preceding embodiments and aspects, the different types of radiation include neutrons and gamma radiation. In another particular embodiment of any of the preceding embodiments and aspects, the scintillator includes a NaI:Tl, CsI:Tl, $Bi_4Ge_3O_{12}$, $LaBr_3$:Ce, $LaCl_3$:Ce, $CaF_2$:Eu, $Gd_2SiO_5$:Ce, $GdI_3$:Ce, $Lu_{2-x}Y_xSiO_5$, wherein x is in a range of 0 to 2; ZnS:Ag, ZnS:Cu, $Y_2SiO_5$:Ce, ZnO:Ga, ZnCdS:Cu, $Cs_2LiYCl_6$:Ce, $Cs_2LiYBr_6$:Ce $Cs_2LiLaCl_6$:Ce, $Cs_2LiGdCl_6$(Ce), $Cs_2LiLaBr_6$:Ce, LiF(Ti), LiI(Eu), $Li_6Gd(BO_3)_3$, an organic liquid scintillator, or any combination thereof. In still another particular embodiment of any of the preceding embodiments and aspects, the scintillator includes ZnS:Ag, ZnS:Cu, $Y_2SiO_5$:Ce, ZnO:Ga, ZnCdS:Cu, $Cs_2LiYCl_6$:Ce, $Cs_2LiYBr_6$:Ce $Cs_2LiLaCl_6$:Ce, $Cs_2LiGdCl_6$(Ce), $Cs_2LiLaBr_6$:Ce, LiF(Ti), LiI(Eu), $Li_6Gd(BO_3)_3$, an organic liquid scintillator that includes an toluene, xylene, benzene, phenylcyclohexane, triethylbenzene, decalin, or phenylxylyl ethane, or any combination of any of the foregoing compounds. In yet another particular embodiment of any of the preceding embodiments and aspects, the photosensor is significantly responsive to blue light or green light. In a further particular embodiment of any of the preceding embodiments and aspects, the photosensor includes a photomultiplier. In a more particular embodiment, the photomultiplier includes a photomultiplier tube or a semiconductor-based photomultiplier.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A radiation detection system comprising:
a scintillator that is capable of emitting scintillating light in response to capturing different types of targeted radiation;
a photosensor optically coupled to the scintillator; and
a control module electrically coupled to the photosensor, wherein the control module is configured to:
analyze state information of the radiation detection system; and
select a first technique to determine which type of targeted radiation is captured by the scintillator, wherein:
the first technique is a particular technique of a plurality of techniques to determine which type of targeted radiation was captured by the scintillator; and
the selection is based at least in part on the analysis.

2. The radiation detection system of claim 1, wherein the state information includes a radiation count rate, an incoming data rate, a parameter related to a hardware constraint of the radiation detection system, an amplitude of the scintillating light or a derivative of the scintillating light, or any combination thereof.

3. The radiation detection system of claim 2, wherein the parameter related to the hardware constraint includes a fraction of a buffer occupied by buffered data that has not been fully analyzed.

4. The radiation detection system of claim 1, wherein:
the control module configured to analyze the state information comprises the control module configured to determine a radiation count rate;
the control module is configured to select the first technique when the radiation count rate is below a predetermined rate; and
the control module is further configured to select a second technique when the radiation count rate is at least the predetermined rate, wherein the second technique is another particular technique of the plurality of techniques.

5. The radiation detection system of claim 1, wherein:
the control module configured to analyze the state information comprises the control module configured to determine an incoming data rate;
the control module is configured to select the first technique when the incoming data rate is below a predetermined rate; and
the control module is further configured to select a second technique when the incoming data rate is at least the predetermined rate, wherein the second technique is another particular technique of the plurality of techniques.

6. The radiation detection system of claim 1, wherein:
the control module configured to analyze the state information comprises the control module configured to determine an amplitude of the scintillating light or the derivative;
the control module is configured to select the first technique when the amplitude is below a predetermined amplitude; and
the control module is further configured to select a second technique when the amplitude is at least the predetermined amplitude, wherein the second technique is another particular technique of the plurality of techniques.

7. The radiation detection system of claim 1, wherein:
the control module configured to analyze the state information comprises the control module configured to determine a radiation count rate and to determine an amplitude of the scintillating light or a derivative of the scintillating light;
the control module is configured to select the first technique when the radiation count rate is below a predetermined rate and the amplitude is below a predetermined amplitude; and
the control module is further configured to:
select a second technique when the radiation count rate is below the predetermined rate and the amplitude is at least the predetermined amplitude;
select a third technique when the radiation count rate is at least the predetermined rate and the amplitude is below the predetermined amplitude; and
select a fourth technique when the radiation count rate is at least the predetermined rate and the amplitude is at least the predetermined amplitude;
wherein the second, third, and fourth techniques are other particular techniques of the plurality of techniques.

8. The radiation detection system of claim 1, further comprising a wavelength shifting material disposed between the scintillator and the photosensor.

9. The radiation detection system of claim 1, wherein the control module is configured to determine which type of radiation is detected.

10. The radiation detection system of claim 9, wherein the control module is configured to increment a counter corresponding to the type of radiation detected.

11. The radiation detection system of claim 10, wherein the control module is configured to switch from the first technique to a second technique in response to a change in the state information, wherein the second technique is different from the first technique.

12. The radiation detection system of claim 11, wherein the switch is performed in real time or near real time.

13. The radiation detection system of claim 11, wherein:
the switch is performed after the first technique is selected;
the determination of which type of radiation is detected is performed by the second technique; and
the counter is incremented in response to detection using the second technique.

14. The radiation detection system of claim 1, wherein the different types of radiation include neutrons and gamma radiation.

15. A method of using radiation detection system comprising:
capturing radiation at a scintillator;
emitting scintillating light in response to capturing the radiation;
generating an electronic signal at a photosensor in response to receiving scintillating light or a derivative of the scintillating light;
analyzing state information of the radiation detection system; and selecting a first technique to determine which type of targeted radiation corresponds to the radiation captured, wherein:

the first, technique is a particular technique of a plurality of techniques to determine which type of targeted radiation was captured; and selecting is based at least in part on the analysis.

16. The method of claim 15, wherein the state information includes a radiation count rate, an incoming data rate, a parameter related to a hardware constraint of the radiation detection system, an amplitude of the scintillating light, or any combination thereof.

17. The method of claim 16, wherein the parameter related to the hardware constraint includes a fraction of a buffer occupied by buffered data that has not been fully analyzed.

18. The method of claim 15, further comprising switching from the first technique to a second technique in response to a change in the state information, wherein the second technique is different from the first technique.

19. The method of claim 18, wherein switching is performed in real time or near real time in response to the change in the state information.

20. The method of claim 15, wherein the different types of radiation include neutrons and gamma radiation.

* * * * *